United States Patent
Bocchiola et al.

(10) Patent No.: US 7,180,273 B2
(45) Date of Patent: Feb. 20, 2007

(54) LOW SWITCHING FREQUENCY POWER FACTOR CORRECTION CIRCUIT

(75) Inventors: Cesare Bocchiola, Milanese (IT); Massimo Grasso, S. Martino S. (PV) (IT); Toshio Takahashi, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 57 days.

(21) Appl. No.: 11/145,683

(22) Filed: Jun. 6, 2005

(65) Prior Publication Data

US 2006/0044854 A1  Mar. 2, 2006

Related U.S. Application Data

(60) Provisional application No. 60/642,826, filed on Jan. 11, 2005, provisional application No. 60/638,125, filed on Dec. 22, 2004, provisional application No. 60/578,010, filed on Jun. 7, 2004.

(51) Int. Cl.
*G05F 1/70* (2006.01)
(52) U.S. Cl. ...................... 323/207; 323/222
(58) Field of Classification Search .............. 323/222, 323/207, 283
See application file for complete search history.

(56) References Cited

U.S. PATENT DOCUMENTS 5,349,284 A * 9/1994 Whittle ....................... 323/207

* cited by examiner

*Primary Examiner*—Shawn Riley
(74) *Attorney, Agent, or Firm*—Ostrolenk, Faber, Gerb & Soffen, LLP

(57) ABSTRACT

A power factor correction circuit for driving a switch of a boost type converter circuit having an AC line frequency input, comprising a sense circuit for sensing and comparing the output voltage of the boost type converter circuit to a reference voltage, a circuit responsive to the output of the sense circuit for providing a drive signal for driving the switch, wherein the drive signal comprises a pulsed signal comprising a pulse grouping during each half cycle of the AC line frequency comprising at least one pulse wherein the number of pulses and frequency of the pulses of the pulse grouping changes with the output of the sense circuit up to a threshold value with the pulse width of the pulses being substantially constant; and when the output of the sense circuit has reached the threshold value, the pulse width of the pulses of the pulse grouping are varied in accordance with the output of the sense circuit.

42 Claims, 7 Drawing Sheets

LOW SWITCHING FREQUENCY POWER FACTOR CORRECTION CIRCUIT

CROSS REFERENCE TO RELATED APPLICATIONS

This application claims the benefit and priority of U.S. Provisional patent application Ser. No. 60/642,826 filed Jan. 11, 2005 entitled LOW SWITCHING FREQUENCY POWER FACTOR CORRECTION CIRCUIT, U.S. Provisional patent application Ser. No. 60/638,125 filed Dec. 22, 2004 entitled LOW SWITCHING FREQUENCY POWER FACTOR CORRECTION CIRCUIT, and U.S. Provisional patent application Ser. No. 60/578,010 filed Jun. 7, 2004 entitled LOW SWITCHING FREQUENCY POWER FACTOR CORRECTION CIRCUIT, the entire disclosures of which are incorporated herein by reference.

BACKGROUND OF THE INVENTION

The present invention relates to power factor correction (PFC) methods and circuits. PFC circuits are known in the literature and are applied in a broad range of electronic equipment, ranging from lighting ballast circuits, to switch mode power supplies, to motor drives.

Such types of equipment generally require a direct current (DC) input voltage to operate properly, and the DC voltage is usually obtained by rectifying and filtering an alternating current (AC) line voltage.

However, any time a non linear load (like an input rectifier bridge followed by a filtering capacitor) is applied to the AC line, such load produces a distortion of the line current from being sinusoidal and in phase with the line voltage.

Such distortion has to be limited for several reasons, but mainly to reduce the losses in the line distribution network as well as the electromagnetic interference (EMI).

Various countries (especially Europe) have issued regulations which define limits to the harmonic content of the current absorbed by any kind of equipment connected to the main distribution network (the AC line), with classifications which apply to different equipment and diversely limit such harmonic content.

For that reason, various types of power factor or harmonic correction circuits (active or passive) have been developed which, added at the input of the equipment, make the equipment compliant with such regulation limits.

For non cost sensitive applications, a properly controlled boost PFC topology is usually applied. Such topology is able to shape the input line current to be substantially sinusoidal and in phase with the line voltage, and is able to regulate quite well the output DC voltage versus load (the power drawn by the equipment) and line variations, but has the following drawbacks:

a) complex and expensive power electronic circuitry is required;
b) high frequency operation generates high frequency EMI;
c) the circuitry acts as a "series" connected active filter in between the rectified line voltage and the equipment to be fed, thereby transmitting all the power drawn by the equipment; and
d) due to that, and due to the high frequency operation, the boost PFC introduces power losses which, often, are not negligible with respect to the total power losses of the equipment to be fed. For a motor drive, for example, electrical to mechanical energy conversion efficiency is greatly reduced.

On the other hand, cost sensitive applications which handle limited amounts of power (below 1 HP) try to avoid the use of such expensive active PFC methods and only use passive filters (usually inductors) in series with the line (before or after the rectifying bridge) at the input of the equipment.

Such "passive" filters, have several drawbacks:

a) they are bulky (and sometime expensive);
b) they also transmit all the power consumed by the equipment, so dissipate significant power;
c) they constitute a series impedance at the equipment's input, thereby reducing the DC voltage available at the equipment itself; furthermore, the voltage drop generated by such series impedance changes with the load. For example: for a motor drive, if the motor requires more torque (hence current) at high speed, the voltage available to the motor goes down (while, at high speed, more voltage would be required).

In the recent past, some "low switching frequency" or "line frequency" active filters have been proposed.

One example is reported in the paper: "A Double-Line-Frequency Commutated Rectifier Complying with IEC-1000-3-2 Standards" by Jose' Antenor Pomilio, School of Electrical and Computer Engineering, University of Campinas (Brasil) and Giorgio Spiazzi, Department of Electronics and Informatics, University of Padova (Italy). Such methods have the general advantage that only part of the power drawn by the equipment is transmitted by the "active" filter, which then dissipates very little power itself. Also, the main filter inductor may be much smaller and cheaper when compared to the one used in a simple passive filter. The circuit switches at line frequency, so power dissipation due to switching losses is further greatly reduced. Finally, such methods generally provide quite good regulation of the output voltage of the filter stage versus load, but, when the auxiliary switch is being driven only once for every line half period as described in the paper, have the general drawback that regulation of the output voltage versus the input (line) voltage variations is very poor.

Another aspect to be considered in cost-sensitive applications is the housekeeping power supply for peripheral circuits such as logic and control circuits. Generally speaking, both the harmonic correction circuit logic or control circuitry and the logic or control circuitry of any equipment/power stage which is fed by the harmonic correction circuit needs a low voltage DC power supply. Such low voltage supply is usually derived by a dedicated circuit (very often a flyback switching power supply directly fed by the rectified line but sometimes a step-down switching regulator) which adds a significant cost to the whole power conversion chain, and, by switching at high frequency, introduces other EMI. In other cases, a simple resistive drop is used, which dissipates much more power than the power it actually delivers to the housekeeping circuitry.

SUMMARY OF THE INVENTION

It is therefore a primary objective of the invention to provide a method for limiting the harmonics of the line current by using a low switching frequency harmonic correction circuit (HCC), which only transmits a part of the total power drawn by the equipment to be fed, and which is able to provide good line and load regulation of the output DC voltage which feeds the equipment.

It is another objective of the invention to integrate the housekeeping power supply into the structure of the harmonic correction circuitry and provide an efficient housekeeping power supply which also does not generate substantial additional EMI.

A method and apparatus for limiting the harmonics of the line current by using a low switching frequency power factor correction or harmonic correction circuit (HCC) is disclosed herein. The invention comprises a power factor correction circuit for driving a switch of a boost type converter circuit having an AC line frequency input, comprising a sense circuit for sensing and comparing the output voltage of the boost type converter circuit to a reference voltage; a circuit responsive to the output of said sense circuit for providing a drive signal for driving said switch, wherein said drive signal comprises a pulsed signal comprising a pulse grouping during each half cycle of the AC line frequency comprising at least one pulse wherein the number of pulses and frequency of the pulses in the pulse grouping changes with the output of said sense circuit up to a threshold value with the pulse width of the pulses being substantially constant; and when said output of said sense circuit has reached said threshold value, the pulse width of said pulses of said pulse grouping are varied in accordance with the output of said sense circuit.

In a preferred embodiment, the sense circuit comprises an error amplifier having an output and the circuit responsive to the sense circuit comprises an oscillator having an input coupled to the output of the sense circuit and wherein the oscillator produces an oscillator signal driving the switch, the oscillator signal having a maximum frequency of operation corresponding to said threshold value.

The circuit is able to achieve good regulation of the output voltage versus both load and line variations in a large range, while keeping harmonics of the line current below limits imposed by International Regulations (mainly European EN61000-3-2 for Class A equipment). The circuit is also able to generate an auxiliary power supply which may be needed by the controller for the correction circuit itself and by other equipment or power stages which are fed by the correction circuit.

BRIEF DESCRIPTION OF THE DRAWINGS

The objects of the invention will be more clear by reviewing the included drawings, in which.

Other features and advantages of the present invention will become apparent from the following description of the invention which refers to the accompanying drawings.

DETAILED DESCRIPTION OF PREFERRED EMBODIMENTS OF THE INVENTION

Figure 1:
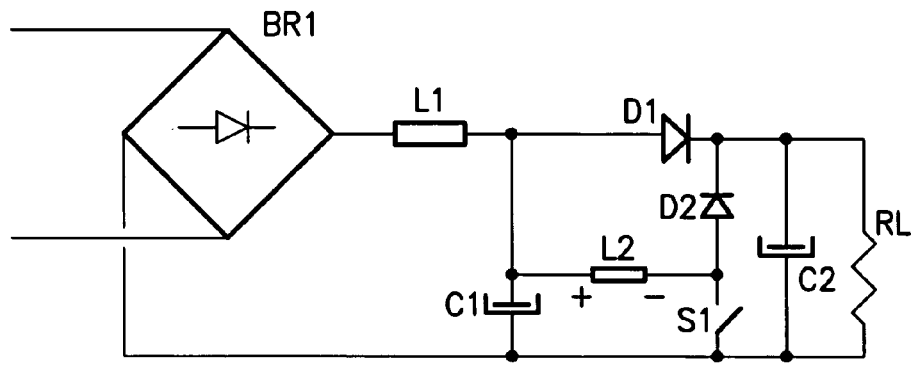
FIG. 1 show the basic topology described in the papers previously mentioned, and which is considered prior art.
Figure 2:
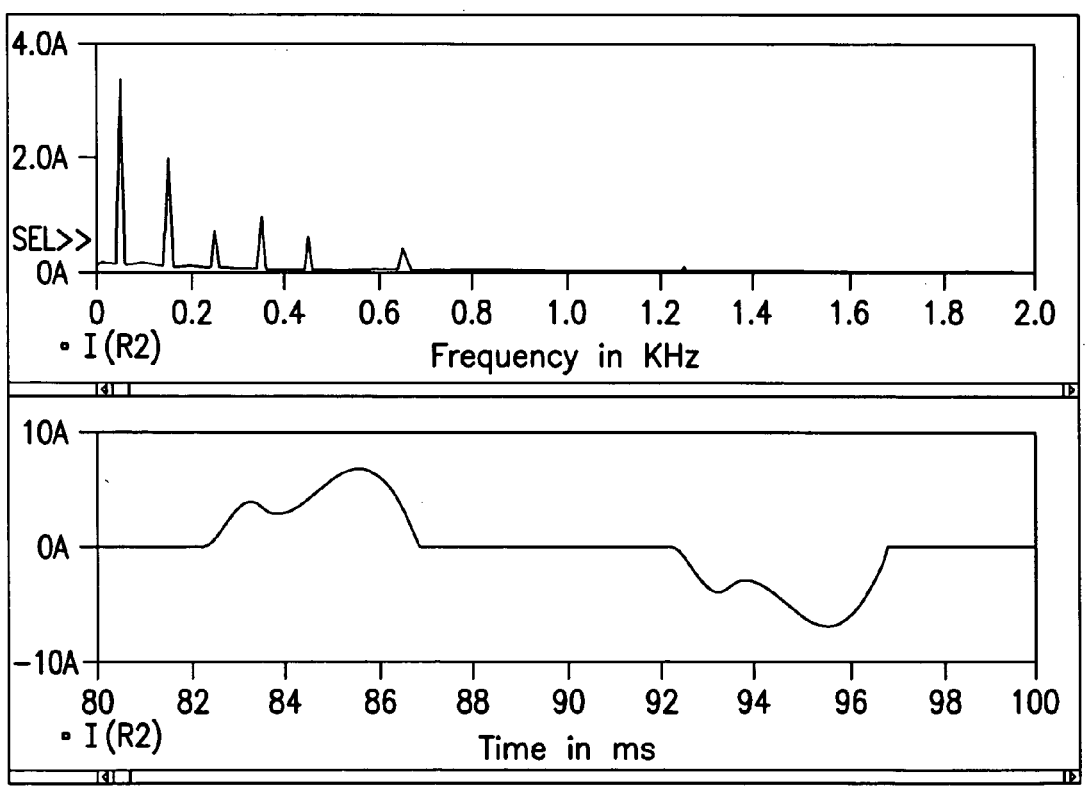
FIG. 2 show the simulated line current waveform and the relevant low frequency spectra for the circuit of FIG. 1. By a proper choice of the values of the components in FIG. 1, the harmonics of the line current may be reduced to comply with the regulations limits.
Figure 3:
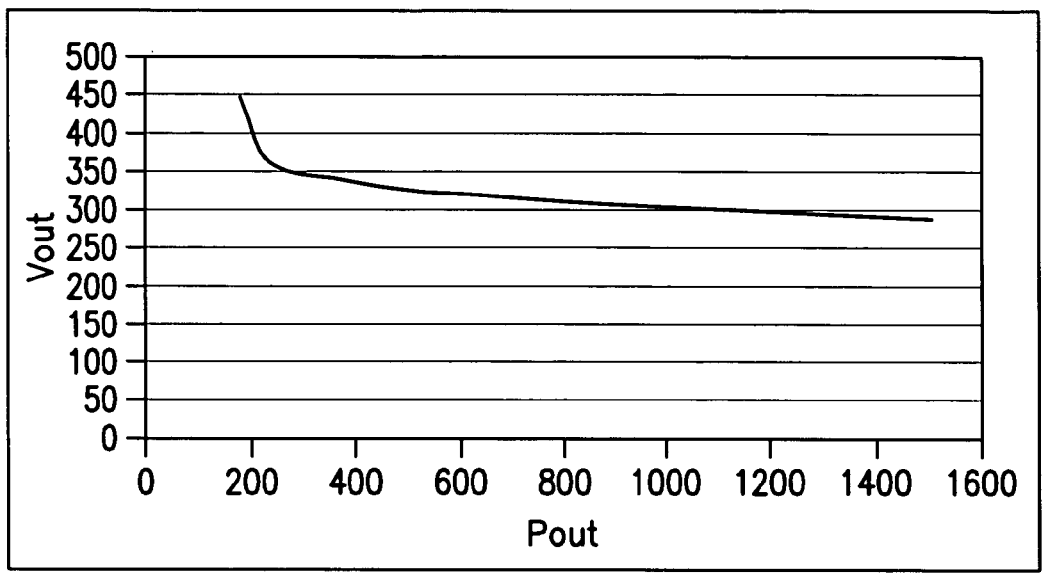
FIG. 3 show the regulation of the DC output voltage which may be achieved by the prior art circuit versus load variations (for a specific design of the circuit components which also allows harmonics of the line current to comply with regulation limits)

In FIG. 1, which is a prior art circuit, RL represents the equipment to be fed (very often a further power conversion stage) as the "equivalent" load to the harmonic correction (or power factor correction) circuit. The harmonic correction circuit comprises L1,C1,L2,S1, D1 and D2, while C2, together with BR1, represent the standard rectifying and filtering stage which, alone, would produce substantial distortion of the line current. In FIG. 1, the housekeeping power supply is not shown.

Referring to FIG. 1, it is clear that the circuit of FIG. 1 has several "degree of freedom" with respect to how the switch S1 can be driven ON and OFF during each line half-period.

Firstly, the modulation of switch S1 has to be the same for subsequent line half periods. In-fact, if it were different between two subsequent half line periods, the line current would become rich in even harmonics, whose regulation limits are much more stringent than for odd harmonics.

Given this constraint, there are a number of possibilities for modulating switch S1. It is, of course already known to change the pulse width. Moreover, there are other possibilities for modulating switch S1. For example, switch S1 can be driven ON and OFF more than once in each half line period. Pulses may be synchronized or non synchronized with the line voltage zero crossing, or they may be delayed with respect to the line voltage zero crossing by a desired amount. Further, they can be "grouped" in the sense that their distribution across the half line period may not be necessarily uniform.

Every time switch S1 in turned ON, energy is accumulated into inductor L2 by slightly discharging capacitor C1. Then energy stored in L2 is transferred back to the capacitor C2 via diode D2 and thus to the load RL when switch S1 is turned OFF.

Prior art describes that, by increasing pulse duration (or width), more energy is stored into L2 and thus there is more "boost" effect which increases the voltage on capacitor C2 (the DC output voltage). On the other hand, by just increasing pulse width, more stress occurs on capacitor C1, inductor L2 and switch S1 (and, partially, also on diode D2).

According to one aspect of the invention, by increasing the number of pulses and leaving the pulse width unchanged, one can achieve the same effect but without stressing the above indicated components.

Further, according to the invention, by combining changing pulse width and pulse number or frequency, very good regulation of the DC output voltage can be achieved not only for load variations, but also for line variation over a large range (for example: 198 Vrms to 254 Vrms).

On the other hand, increasing pulse number to more than one pulse for each line half-period, increases line current distortion. Thus, a preferred modulation strategy is disclosed which maintains low line current distortion while keeping the benefits of achieving DC output voltage regulation versus load and line variations, and limiting the stress on components C1, L2, S1 and D2.

Figure 4:
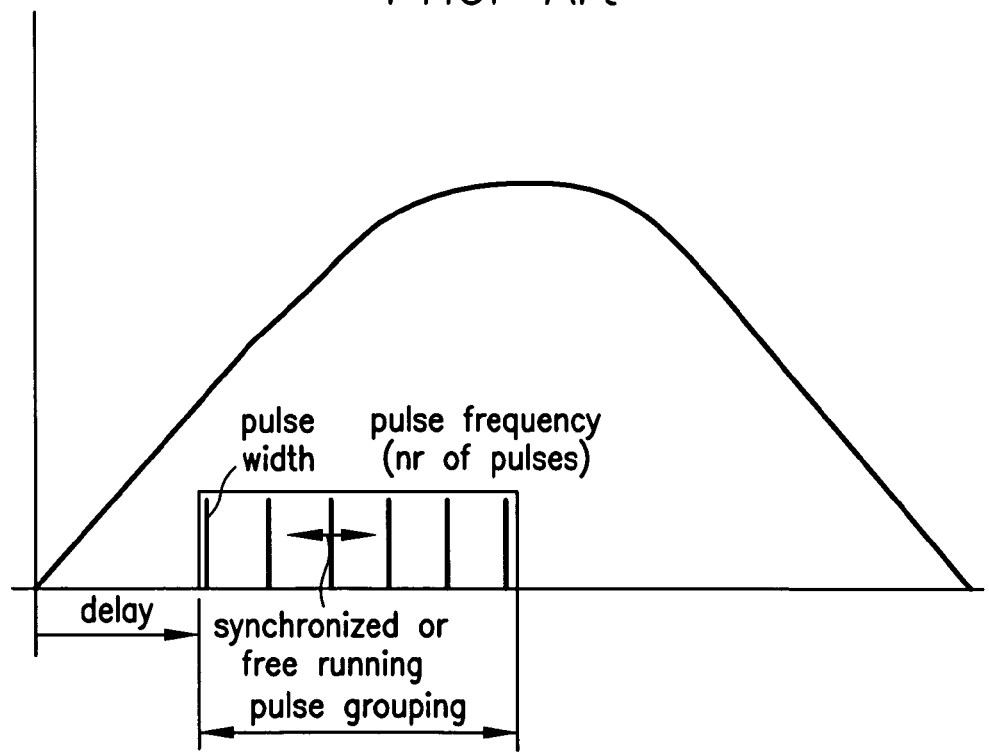
FIG. 4 shows an example of the modulation strategy of the invention, which allows achieving very good regulation of the output DC voltage versus line and load variations.

A preferred modulation strategy has been found to be one where pulses are started with a delay corresponding to a quarter of the half line period (2.5 msec with 50 Hz line), and are concentrated in a portion (approximately half) of such half-line period (5 msec for 50 Hz line), so concentrated around the line voltage peak. This is shown in FIG. 4. In FIG. 4, the pulses are the gate voltage applied to switch S1 which can be an IGBT or mosfet or bipolar transistor. In case of a bipolar transistor, the pulses are the base current.

This modulation strategy has been found experimentally. It can in fact be shown that a closed solution to the system of differential equations which govern the circuit behavior does not exist for multiple pulses.

An example of how the circuit can regulate output DC voltage is now provided.

At Vline=254V, 1 pulse with a 60 usec duration and delayed by 2.5 msec with respect to the line voltage zero crossing provides a 336V output with 637 W effective output power.

Going down to 230V, 10 pulses of 60 us duration are needed to maintain the same output voltage.

Going further down to 198V, 10 pulses of 110 us duration or 15 pulses of 80 us duration or any other combination of pulse number and pulse width is available to provide a 336 V output.

Figure 6:
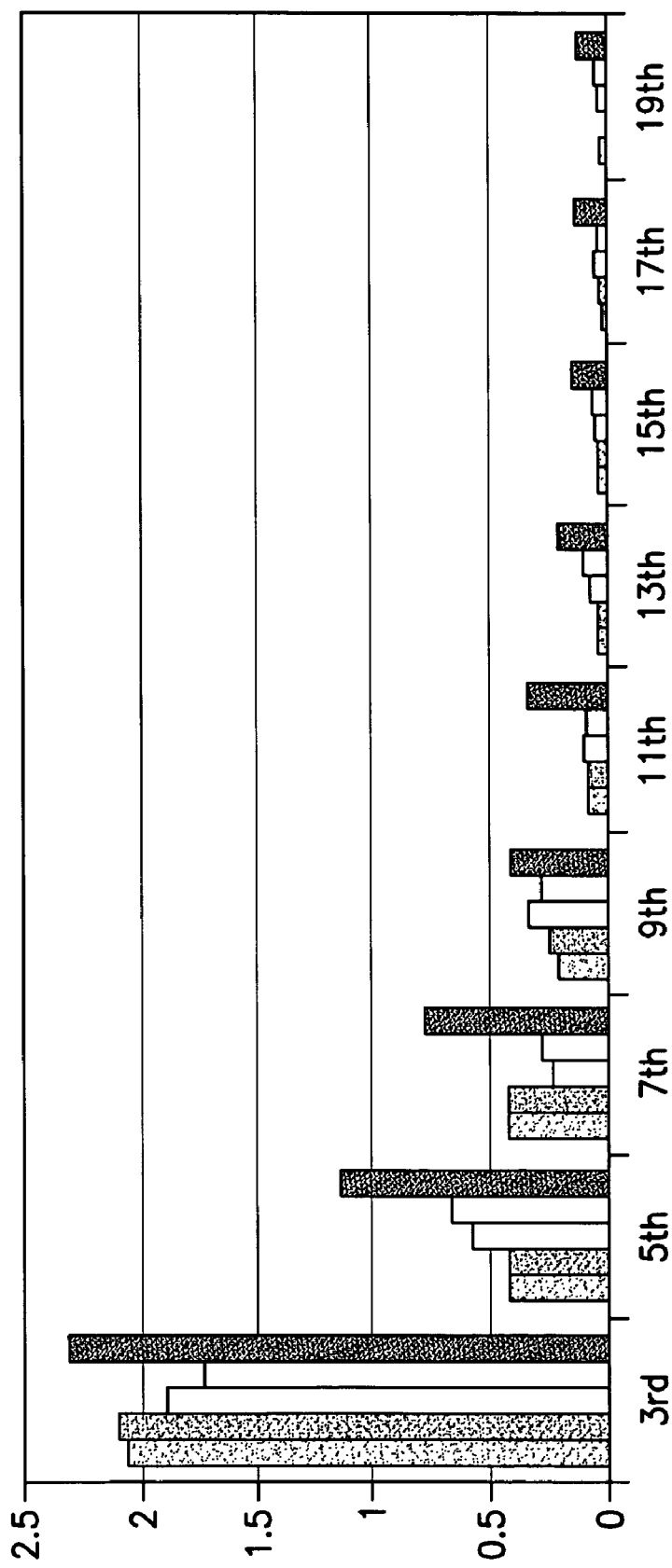
FIG. 6 show the actual (measured) spectra of the line current achieved by using the modulation strategy described in FIG. 4.

FIG. 6 show the harmonic content of the line current, compared with the EN61000-3-2 Class A limits, for the above described four operating conditions.

FIG. 6 show the spectra of the line current (limited to $19^{th}$ harmonic for sake of clarity) for the proposed circuit, when the optimized pulse strategy, which is another object of the invention, is applied, to maintain constant DC output voltage versus line variations (the four columns for each harmonic number correspond to line current harmonics drawn for four different values of the line voltage between 198 and 254 Vac) at constant output power (637 W in the example).

The last column for each harmonic number in FIG. 6 are the limits as per EN61000-3-2 Class A, here reported for sake of clarity.

Figure 5:
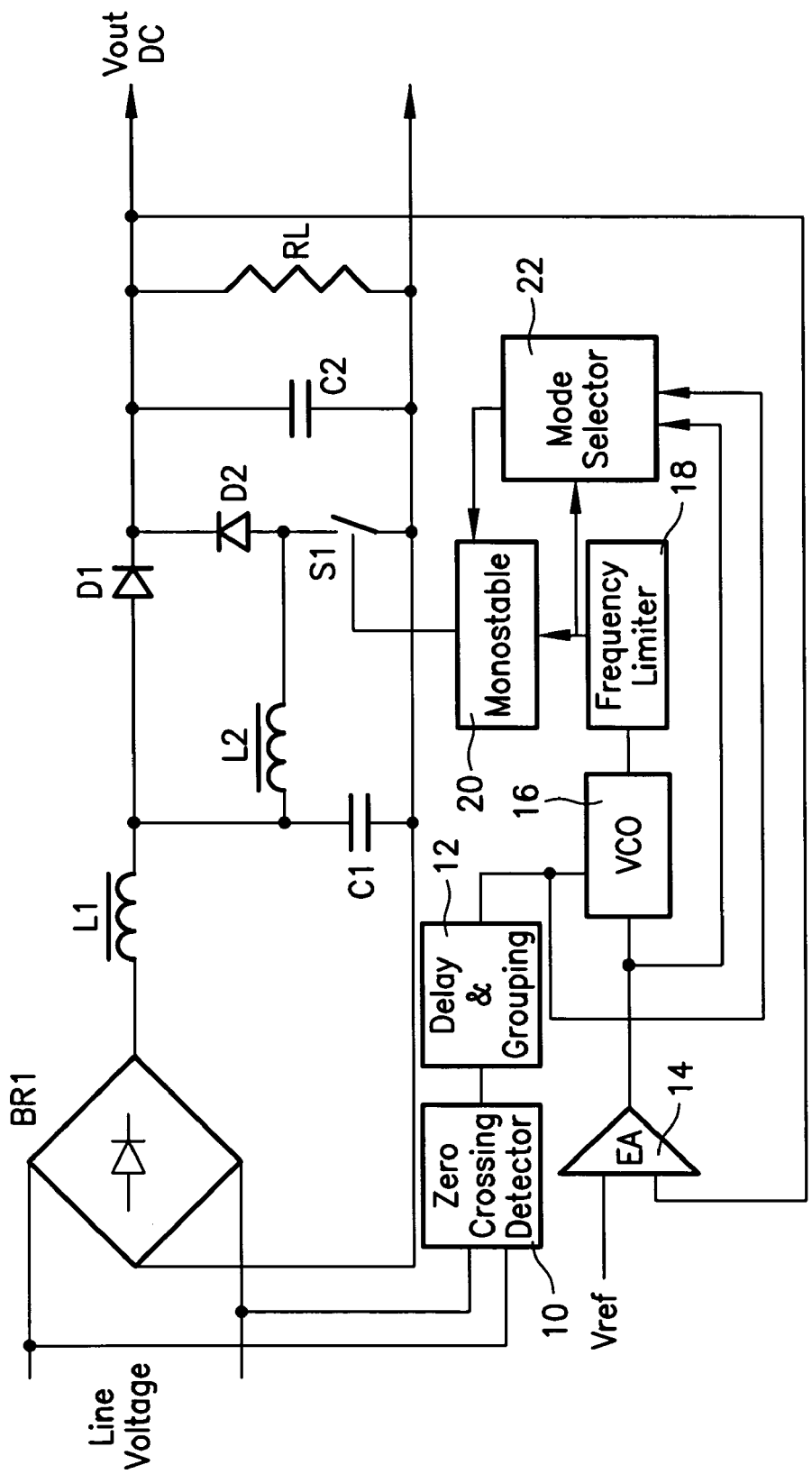
FIG. 5 shows a circuit diagram for implementing the modulation strategy of the invention.

Now referring to FIG. 5, a preferred circuit to realize such combination of pulse number and pulse duration is described.

Zero crossing detector 10 provides short pulses every line voltage zero crossing. Such pulses (whose duration shall preferably be few usec to few tens usec) feed a logic circuit 12 (which may be realized by a monostable multivibrator and logic circuitry or by a microcontroller) which generates a fixed or programmable delay and window for a pulse grouping. Such circuit will generate the window for the pulse grouping, i.e., the window within which the pulses of the pulse grouping can be applied to the gate (or base) of S1 by the control circuit.

Error amplifier EA (14) provides an error signal which is the difference between a reference voltage (Vref: the desired DC output voltage) and the actual DC output voltage at the output of the circuit.

Such error signal commands a VCO (voltage controlled oscillator) 16 which provides, for example, a square wave whose frequency increases as the error signal increases.

Since the frequency could become very high (mainly when the circuit is first connected to the line voltage and capacitor C2 is fully discharged), a frequency limiter 18 is provided which limits the frequency to a reasonable level. This frequency, which also corresponds to the number of pulses in the grouping window, depends on the design constraints of the circuit.

The VCO 16 and the frequency limiter 18 are preferably designed to provide at least one pulse. The reason for this will be explained later on.

Power dissipation of the proposed circuit increases as the number of pulses increases. Main sources of power dissipation are the parasitic equivalent series resistance (ESR) of C1, the parasitic resistance of L2, and the conduction losses of the switch S1, plus some loss due to the forward conduction voltage of D2.

Power dissipated into L1 and D1 is instead almost constant and independent of the number of pulses provided to the control electrode of switch S1.

Thus, depending on the design of L2,C1,S1 and D2, one may want to limit the power dissipation by limiting the maximum number of pulses. This will limit the range of input voltage and load where constant VoutDC may be achieved but the best trade-off depends on the specific application requirements.

Frequency limiter 18 can also be an integral part of the VCO, i.e., the VCO can be designed in a way to be intrinsically frequency limited.

The signal from the VCO/Frequency limiter 16,18 has been described as a square wave of variable frequency. This is not a limitation. A variable frequency sinusoidal waveform can be used instead. In this case, a simple comparator (not shown in FIG. 5) can be used to provide a square wave signal.

The leading edge (or the trailing edge) of this square wave is applied to a monostable multivibrator 20, which provides a control signal to the gate (or base) of S1 comprising the pulses of the pulse grouping whose duration is generally only few tens microsec to a few hundred microsec.

Pulses are actually provided to the gate (or base) of S1 via any kind of suitable driver (not shown in the figure) whose function is to adapt the output impedance of the monostable to the input impedance of S1.

The monostable 20 generates pulses whose pulse width must be controlled in a proper way.

In particular, until the frequency has not yet reached its maximum, pulse width is fixed to the minimum value (Tpulse,min) which, in turn, depends on the design constraints of the application. When the frequency has reached its maximum, and the frequency limiter starts working, pulse width is increased to provide voltage regulation.

Figure 7:
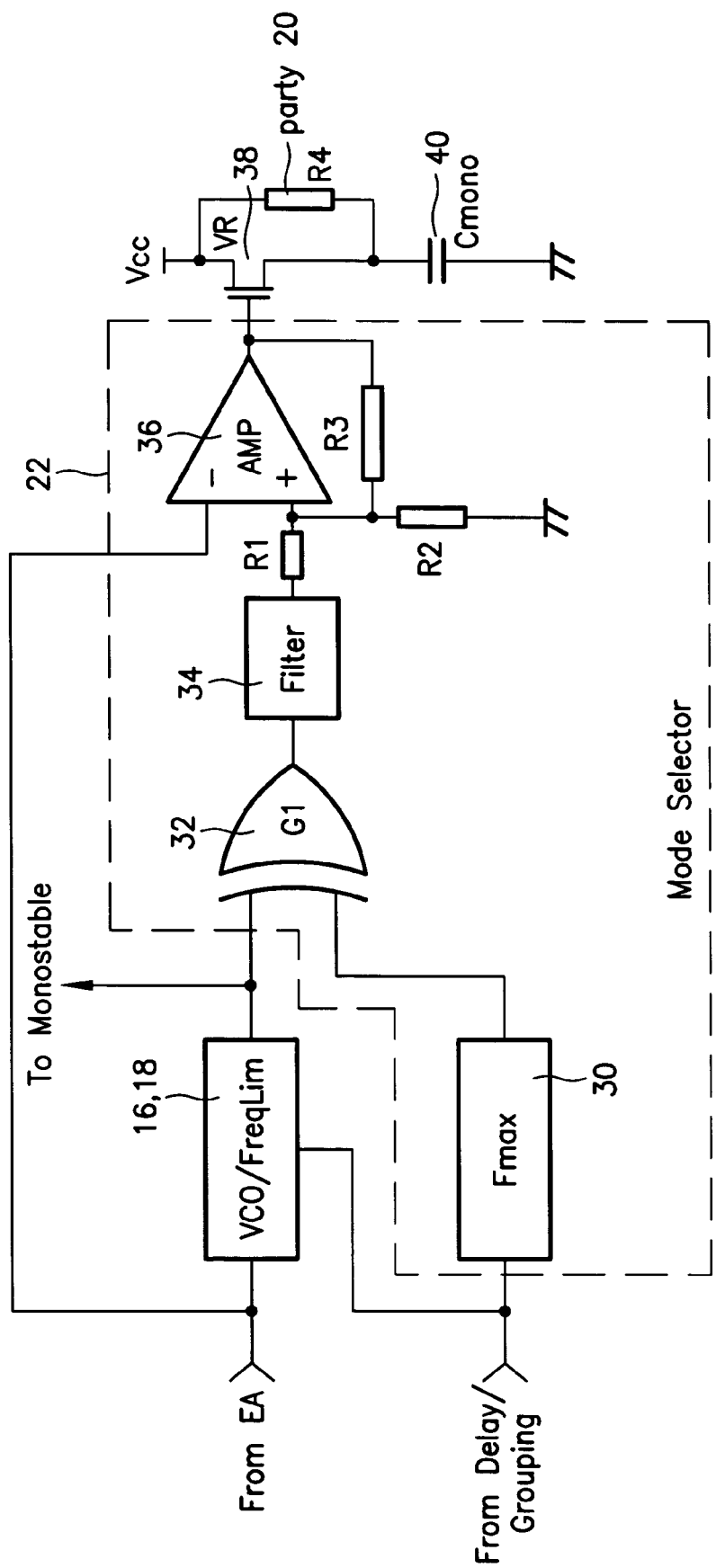
FIG. 7 show details of the mode selector circuit of FIG. 5 whose function will be clarified in the following discussion.

This is performed by a mode selector 22, which, in one possible form, is shown in FIG. 7.

With reference to FIG. 7, the block Fmax (30) provides a frequency equal to the maximum frequency set in the VCO/frequency limiter 16,18. The two frequencies must be synchronized with each other.

Assuming the two frequencies are square waves with 50% duty cycle, when the VCO frequency is lower than Fmax, the exclusive-OR 32 output of the two signals provides a series of pulses of variable duration which, when filtered by filter 34, provides an analog signal greater than zero.

When the two frequencies are equal to each other, the exclusive OR provides a constant logic ZERO, which, filtered, provides an analog output signal equal to zero volts.

Such signal feeds an operational amplifier 36, which receives on its negative input the output voltage of the error amplifier EA (14) of FIG. 5.

When the VCO frequency and Fmax are different, the gain of the operational amplifier 36 is set in such way that the signal out of the filter, through resistor R1, saturates the amplifier 36 internal to the mode selector 22. So, the output of amplifier 36 will be at the maximum level.

When the two frequencies are equal, the output voltage from the filter becomes zero, and the amplifier 36 will simply amplify, with a desired gain, the output voltage from the error amplifier 14.

The output signal of amplifier 36 feeds the gate of a signal mosfet 38 (VR in FIG. 7) which acts as variable resistance across R4 for the charging of capacitor Cmono (40).

VR, R4 and Cmono are the components of the monostable multivibrator 20 that select the pulse width of the monostable block, which, in turn, provides the pulses for the control of S1 in the circuit of FIG. 5.

In this way, when VCO 16 has not yet reached its maximum frequency, the VR resistance will be at the minimum, thus providing a constant pulse width from the monostable with a variable number of pulses based on the VCO frequency and thus variable frequency.

When the VCO frequency has reached Fmax, the output from EA 14 will start to modulate the ON-resistance of the mosfet VR, thus modulating the pulse width at constant frequency because the VCO is at Fmax.

Resistor R4 in parallel to VR will simply assure that, even in case of saturation of the EA 14 output, pulse width is limited to a maximum value.

Too long a pulse width could increase the stress level on components L2, C1, S1 and D2 of FIG. 5.

Thus, as the output voltage of the circuit of FIG. 5 decreases, assuming the maximum frequency has been reached, the output of error amplifier EA will increase causing the output of amplifier 36 to decrease, resulting in increased VR resistance and thus increasing the pulse width, thereby driving the output voltage higher. When the output voltage increases, the error amplifier output will decrease. Assuming the frequency of the VCO is at a maximum, this will result in an increased output from amplifier 36, causing the VR resistance to decrease, resulting in a reduced pulse width and driving the output voltage lower.

In case of no load at the output of the circuit of FIG. 5, error amplifier 14 will command the VCO to minimum frequency (one pulse every line half-period) and the monostable will generate a pulse with the minimum designed width.

The behavior in case of no load conditions is important for the following discussion about the housekeeping power supply.

Before discussing the housekeeping supply, the case where the input voltage is very low or the desired output voltage is very high needs to be examined. In this case, to achieve more boost action, Fmax has to be selected to be relatively high. Frequencies Fmax above 1 kHz are possible but, in that case, high frequency harmonics could start to appear in the line current spectra. More particularly, differential mode electro-magnetic noise as well as common mode electro-magnetic noise will start to be present.

While differential mode noise is well filtered by L1 (which, together with C1 also acts as a high frequency input filter), common mode noise is more difficult to predict because it strongly depends on leakage paths to Earth potential (possibly including parasitic capacitances of L1 due to its physical construction).

It is well known that common mode noise can be reduced by inserting a common mode inductor at the converter's input or, simply, by balancing the inductive impedance at the same input.

Figure 9:
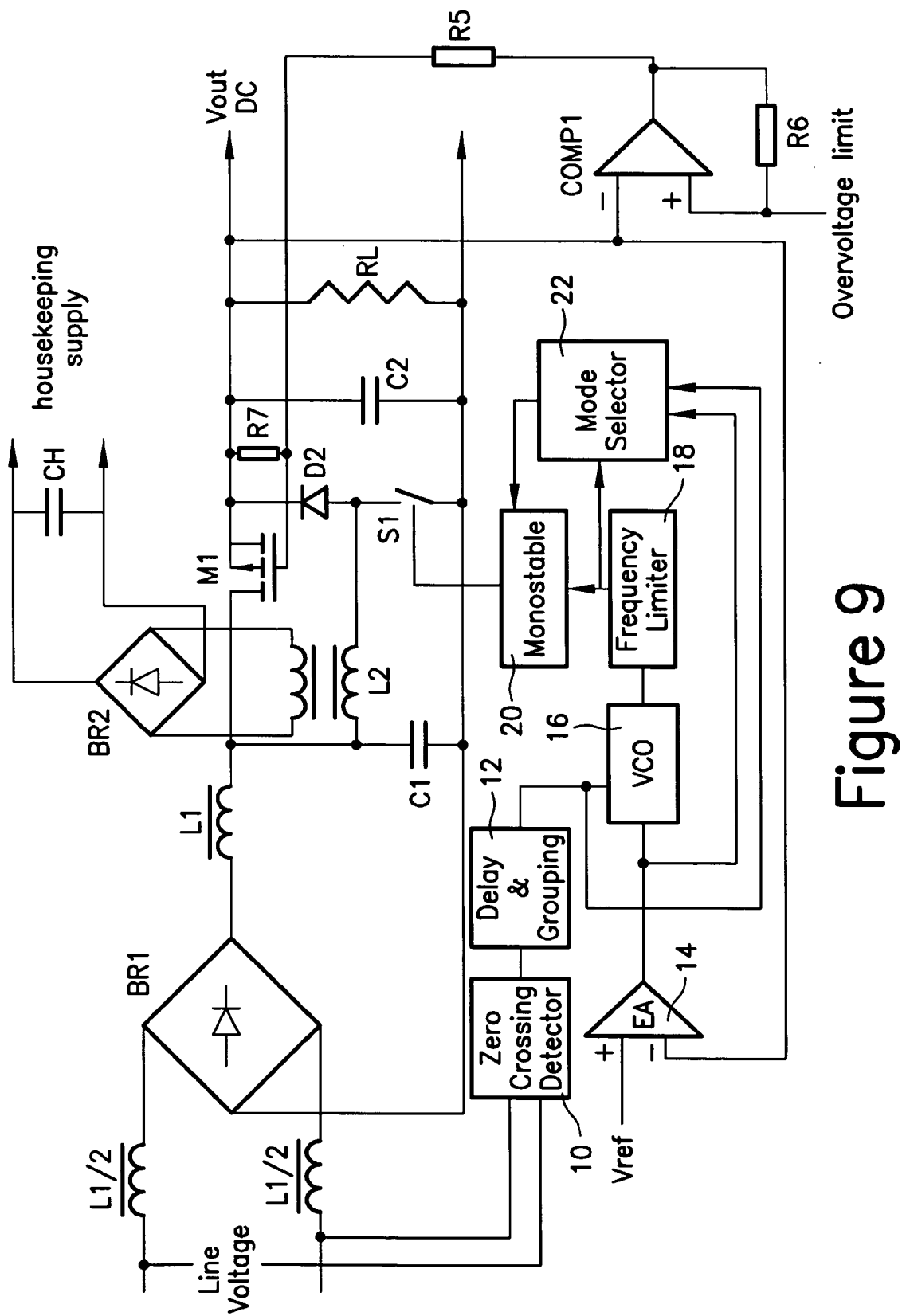
FIG. 9 show another embodiment of the present invention, where inductor L1 is split into two separate sections on the line side of the input bridge.

Thus, by moving L1 from the diode's bridge output side to its input side, and by splitting it into two separate but equal inductors each one equal to half of the original L1 value, while not altering in any way the behavior of the circuit, may have the added benefit of limiting the common mode noise eventually generated in case of high Fmax values. This is shown in FIG. 9.

Figure 8:
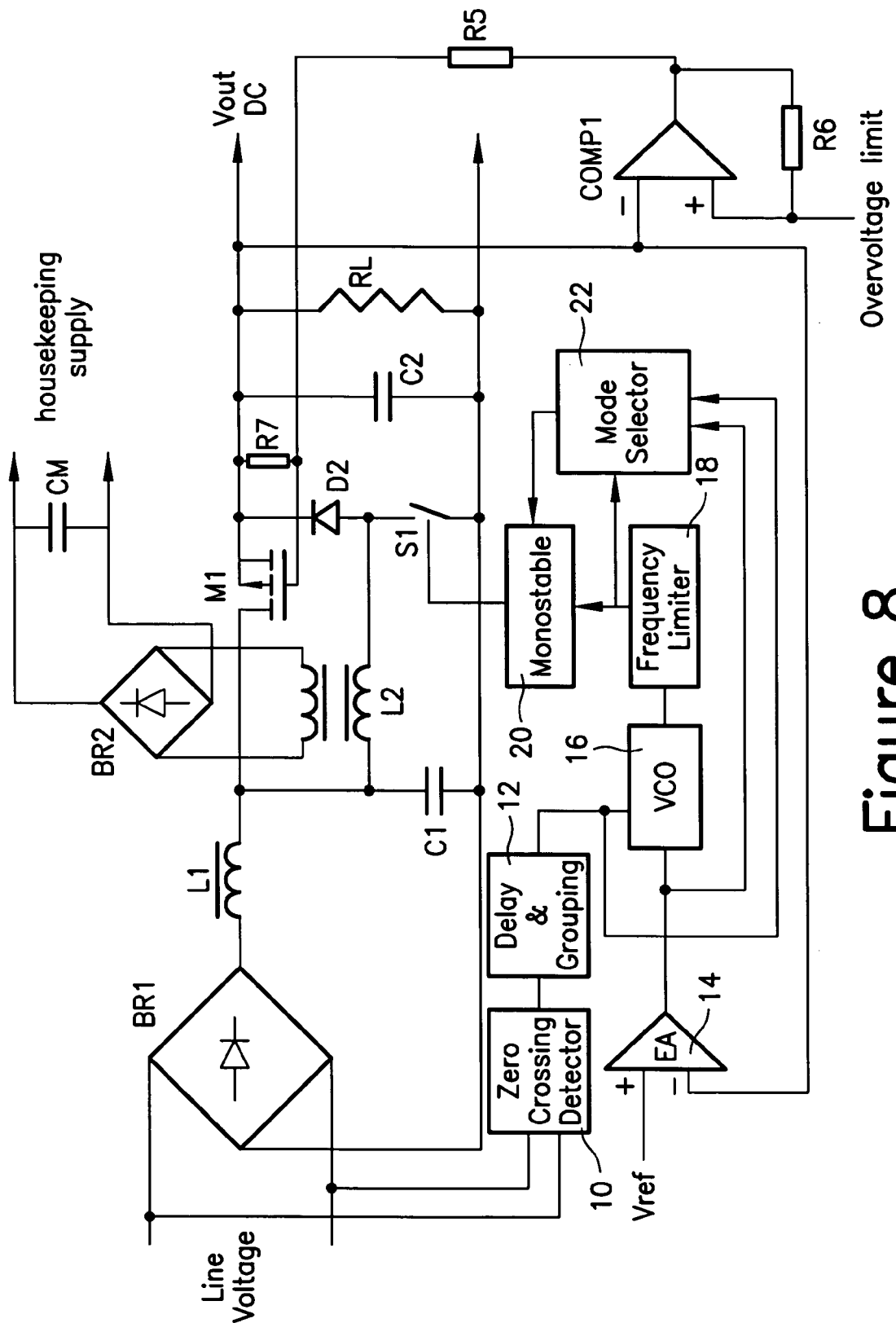
FIG. 8 shows a more detailed circuit realization including a housekeeping power supply.

Now with reference to FIG. 8, it may be seen that inductor L2 has been modified to be a transformer, whose turn ratio is chosen to achieve the desired housekeeping DC voltage. The voltage waveform at the transformer's output is rectified by, for example, bridge BR2 and filtered by CH.

The energy transferred to the housekeeping power supply depends on the number of pulses, according to the modulation strategy previously described.

Thus, when the correction circuit is operating with a certain load (different form zero), S1 will be driven by one or more pulses with variable width, to regulate output voltage versus line and load variations. At minimum load and maximum line voltage, a single pulse with minimum width will be generated while at maximum load and minimum line voltage a maximum number of pulses with maximum width will drive S1.

In that sense, the housekeeping power supply output will be variable, not regulated. This is not a problem because, considering the usually low power needed by the logic circuitry, a simple linear voltage regulator will provide regulated voltage required by the logic circuitry itself.

But, in the case of a completely zero load, even a single pulse on S1, with a minimum width, can provide a boost action which is too great. This could cause dangerous over voltages across capacitor C2 and the following equipment/power stages.

To avoid this, diode D1 is changed to a mosfet M1 (see FIG. 8). M1 is kept OFF during normal operation, so that its body diode performs the function which was performed by D1. When in zero load condition, C2 will start to charge until a threshold, but still safe over voltage situation is detected by comparator COMP1. When the threshold is reached, the output of COMP1 will then switch M1 ON.

With M1 ON, energy stored into L2 will be diverted back to C1, instead of being delivered to C2. In this way, C2 and the following equipment/power stages will be kept at a safe voltage.

At the same time, L2 will always be operated at least once every half line period, thereby assuring a proper energy transfer to the housekeeping output.

COMP1 should have a proper hysteresis (represented by R6 in FIG. 8). As soon as M1 is driven ON, the output voltage will fall to a level which is equal to the peak line voltage. COMP1 must continue to drive M1 ON in these conditions.

Then, in case a load is applied again at the output, the output voltage will rapidly go down and COMP1 will reset to switch M1 OFF. Error amplifier EA will now go out of saturation and normal operation will be restored.

All these transients are not very critical. The described circuit is very fail-safe in case M1 fails in a short condition or in case COMP1 fails in driving M1 always ON. If this happens, the output voltage will not rise to the level commanded by EA. EA will try to command the maximum pulse frequency and width, and there will be some power dissipation into the circuit of C1, L2, S1 and D2 but within the design limits. The circuit will continue to provide harmonic correction but will not be able to the regulate output voltage. Nevertheless, no circuit damage will occur.

In FIG. 8, a P-channel mosfet has been used for M1. The output of COMP1 can very easily drive this mosfet by using a couple of resistors (R5 and R7). Of course also an N-channel device can be used, increasing a bit the gate drive complexity, for example, by using a charge pump or bootstrap type supply.

FIG. 9 shows the circuit of FIG. 8 wherein the inductor L1 has been split and moved to the input to limit common mode noise.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A power factor correction circuit for driving a switch of a boost type converter circuit having an AC input at a line frequency, comprising:
   a sense circuit for sensing and comparing the output voltage of the boost type converter circuit to a reference voltage;
   a circuit responsive to the output of said sense circuit for providing a drive signal for driving said switch, wherein said drive signal comprises a pulsed signal comprising a pulse grouping during each half cycle of the AC line frequency comprising at least one pulse wherein the number of pulses and frequency of the pulses of the pulse grouping changes with the output of said sense circuit up to a threshold value with the pulse width of the pulses being substantially constant; and when said output of the sense circuit has reached said threshold value, the pulse width of said pulses of said pulse grouping are varied in accordance with the output of said sense circuit.

2. The circuit of claim 1, wherein said sense circuit comprises an error amplifier having an output and the circuit responsive to the sense circuit comprises an oscillator having an input coupled to the output of the sense circuit and wherein the oscillator provides an oscillator signal driving the switch, the oscillator signal having a maximum frequency of operation corresponding to said threshold value.

3. The circuit of claim 2, wherein said circuit responsive to the output of said sense circuit further comprises a circuit for varying the number of pulses of said drive signal when said oscillator frequency is below said maximum frequency; and for varying said pulse width of said drive signal when said oscillator frequency has reached said maximum frequency and the output of said error amplifier varies.

4. The circuit of claim 2, wherein, as the output of the error amplifier increases, the frequency of the oscillator signal increases up to said maximum frequency; and when said maximum frequency of said oscillator is reached, and the output of said error amplifier continues to increase, the pulse width of said pulses of said pulse grouping is increased.

5. The circuit of claim 2, wherein the circuit responsive to the sense circuit further comprises:
   a mode selector circuit responsive to the oscillator frequency for changing said drive signal from a pulse grouping of varying frequency to a fixed frequency pulse grouping where the pulse width of the pulse grouping varies once said oscillator frequency has reached said maximum frequency.

6. The circuit of claim 5, wherein the circuit responsive to the sense circuit comprises a circuit for limiting the frequency of said oscillator and a pulse generation circuit receiving said frequency limited output of the oscillator for generating said pulse grouping.

7. The circuit of claim 6, wherein the pulse generation circuit comprises a multivibrator circuit.

8. The circuit of claim 2, further comprising a window generation circuit for providing a time window when said oscillator produces an output to a predefined portion of each half cycle of the AC line frequency.

9. The circuit of claim 8, wherein the window generation circuit comprises a circuit for delaying the window by a predefined delay time after a zero crossing of said line frequency AC input.

10. The circuit of claim 9, further comprising a zero crossing detector for detecting the zero crossings of said AC line input.

11. The circuit of claim 2, wherein said oscillator comprises a voltage controlled oscillator.

12. The circuit of claim 7, wherein the mode selector circuit comprises a circuit for providing said oscillator output to drive said switch with pulses of constant pulse width when said oscillator output varies below said maximum frequency in response to said error amplifier output; and a further circuit for varying the pulse width of said pulses of said drive signal when said oscillator frequency has reached said maximum frequency when said output of said error amplifier varies.

13. The circuit of claim 12, wherein said further circuit comprises
   a circuit providing an oscillator signal at said maximum frequency as a reference signal; and
   a circuit comparing said maximum frequency reference signal to said oscillator output and for producing a first output when the oscillator frequency is below said maximum frequency and producing a second output when the oscillator frequency equals said maximum value.

14. The circuit of claim 13, wherein said comparing circuit comprises a logic circuit and a filter circuit providing an output to an amplifier such that the amplifier is saturated when the oscillator frequency is below the maximum frequency and the output to the amplifier is approximately zero when the oscillator frequency equals the maximum frequency.

15. The circuit of claim 14, wherein the logic circuit comprises an exclusive OR circuit receiving said oscillator output at one input and said frequency reference signal at a second input.

16. The circuit of claim 15, wherein said amplifier provides an output to said multivibrator to change the pulse width of pulses generated by said multivibrator.

17. The circuit of claim 1, further comprising a protection circuit for preventing an output voltage of said boost type converter circuit from exceeding a specified value.

18. The circuit of claim 17, wherein the boost type converter circuit comprises a boost inductance in series with a boost diode and coupling an output of an AC rectifier to the output of the boost type converter circuit, and said protection circuit comprises a circuit comparing said output voltage of said boost type converter circuit to an overvoltage limit reference value, and for turning on a controlled switch disposed in parallel with the series connection of the boost inductance and the boost diode coupling the output of the AC rectifier to the output of the boost type converter circuit, thereby transferring charge at the output of said boost type converter circuit to an input capacitor if said output voltage exceeds a predefined limit.

19. The circuit of claim 1, further comprising a second power supply for providing a second output voltage, said second power supply being fed from a winding inductively coupled to said boost inductance.

20. The circuit of claim 18, further comprising an input inductance coupled between said AC rectifier and said boost inductance for filtering noise.

21. The circuit of claim 20, further comprising an input capacitance coupled to said input inductance for filtering noise.

22. The circuit of claim 18, further comprising an input inductance coupled in series in each line of said AC input coupling each said line to said AC rectifier.

23. A method for driving a switch of a boost type converter circuit having an AC input at a line frequency, to reduce harmonies in the AC input, comprising:

sensing and comparing the output voltage of the boost type converter circuit to a reference voltage and producing an error signal;

providing a drive signal for driving said switch, wherein said drive signal comprises a pulsed signal comprising a pulse grouping during each half cycle of the AC line frequency comprising at least one pulse wherein the number of pulses and frequency of the pulses of the pulse grouping changes with the error signal up to a threshold value with the pulse width of the pulses being substantially constant; and when said threshold value has been reached, the pulse width of said pulses of said pulse grouping are varied in accordance with variation in said error signal.

24. The method of claim 23, wherein said step of sensing comprises providing an error amplifier having said error signal as an output and the step of providing a drive signal comprises generating an oscillator signal having a maximum frequency of operation corresponding to said threshold value.

25. The method of claim 24, wherein said step of providing a drive signal comprises varying the number of pulses of said drive signal when said oscillator signal frequency is below said maximum frequency; and varying said pulse width of said drive signal when said oscillator signal frequency has reached said maximum frequency and the output of said error amplifier varies.

26. The method of claim 24, wherein, as the output of the error amplifier increases, the frequency of the oscillator signal increases up to said maximum frequency; and when said maximum frequency of said oscillator signal is reached, and the output of said error amplifier continues to increase, the pulse width of said pulses of said pulse grouping is increased.

27. The method of claim 24, wherein the step of providing drive signal further comprises:

changing said drive signal from a pulse grouping of varying frequency to a fixed frequency pulse grouping where the pulse width of the pulse grouping varies when said oscillator signal frequency has reached said maximum frequency.

28. The method of claim 27, further comprising limiting the frequency of said oscillator signal and receiving said frequency limited oscillator signal to generate said pulse grouping.

29. The method of claim 24, further comprising providing a limited time window during which said oscillator signal is produced to a predefined portion of each half cycle of the AC line frequency.

30. The method of claim 29, wherein the step of providing a time window further comprises delaying the window by a predefined delay time after a zero crossing of said line frequency AC input.

31. The method of claim 30, further comprising detecting the zero crossings of said AC line input.

32. The method of claim 27, wherein said step of changing said drive signal comprises providing said oscillator signal to drive said switch with pulses of constant pulse width when said oscillator signal varies below said maximum frequency in response to said error amplifier output; and varying the pulse width of said pulses of said drive signal when said oscillator signal frequency has reached said maximum frequency when said output of said error amplifier varies.

33. The method of claim 32, wherein said step of varying the pulse width comprises:

providing an oscillator reference signal at said maximum frequency; and comparing said maximum frequency reference signal to said oscillator signal and producing a first output when the oscillator signal frequency is below said maximum frequency and producing a second output when the oscillator frequency equals said maximum value.

34. The method of claim 33, wherein said step of comparing comprises providing an output to an amplifier such that the amplifier is saturated when the oscillator signal frequency is below the maximum frequency and the output to the amplifier is approximately zero when the oscillator frequency equals the maximum frequency.

35. The method of claim 34, wherein the step of comparing comprises exclusive ORing said oscillator signal and said oscillator reference signal.

36. The method of claim 35, wherein said amplifier output changes the pulse width of pulses generated by a multivibrator.

37. The method of claim 23, further comprising preventing an output voltage of said boost type converter circuit from exceeding a specified value.

38. The method of claim 37, wherein the boost type converter circuit comprises a boost inductance in series with a boost diode and coupling an output of an AC rectifier to the output of the boost type converter circuit, and said step of preventing comprises comparing said output voltage of said boost type converter circuit to an overvoltage limit reference value, and turning on a controlled switch disposed in parallel with the series connection of the boost inductance and the boost diode coupling the output of the AC rectifier to the output of the boost type converter circuit, thereby transferring charge at the output of said boost type converter circuit to an input capacitor if said output voltage exceeds a predefined limit.

39. The method of claim 23, further comprising providing a second output voltage, said second output voltage being fed from a winding inductively coupled to said boost inductance.

40. The method of claim 23, further comprising providing an input inductance between said AC rectifier and said boost inductance for filtering noise.

41. The method of claim 40, further comprising providing an input capacitance coupled to said input inductance for filtering noise.

42. The method of claim 38, further comprising providing an input inductance in series in each line of said AC input coupling each said line to said AC rectifier.

* * * * *